Dec. 9, 1924.  
R. S. MOORE  
1,518,808  
STEERING MECHANISM FOR LOCOMOTIVE CRANES  
Filed July 17, 1920  
6 Sheets-Sheet 1

FIG. 1.

Witnesses:  
Harry R. L. White  
McKilroy

Inventor  
Roy S. Moore.  
By Arthur L. Sprinkle

Dec. 9, 1924.

R. S. MOORE

1,518,808

STEERING MECHANISM FOR LOCOMOTIVE CRANES

Filed July 17, 1920     6 Sheets-Sheet 3

Dec. 9, 1924. 1,518,808
R. S. MOORE
STEERING MECHANISM FOR LOCOMOTIVE CRANES
Filed July 17, 1920 6 Sheets-Sheet 4

Dec. 9, 1924.                                              1,518,808
R. S. MOORE
STEERING MECHANISM FOR LOCOMOTIVE CRANES
Filed July 17, 1920       6 Sheets-Sheet 6

Patented Dec. 9, 1924.

1,518,808

UNITED STATES PATENT OFFICE.

ROY S. MOORE, OF CHICAGO, ILLINOIS, ASSIGNOR TO THE MOORE SPEEDCRANE, INC., A CORPORATION OF INDIANA.

STEERING MECHANISM FOR LOCOMOTIVE CRANES.

Application filed July 17, 1920. Serial No. 397,077.

*To all whom it may concern:*

Be it known that I, ROY S. MOORE, a citizen of the United States, residing at Chicago, in the county of Cook and State of Illinois, have invented certain new and useful Improvements in Steering Mechanism for Locomotive Cranes.

In machines of this character such as road cranes and locomotive cranes, steam shovels and the like, it is the common practice to pivotally mount a swing body or rotating bed on a suitable truck or car body and the operator when such machine is self propelled is of necessity stationed upon the swing body or rotating bed which usually carries the power source. It has been heretofore proposed to operate the steering wheels of the car body or truck by bodily movement of the swing body or rotating bed, first making suitable temporary connections between such bed and the steering wheel or other devices for the purpose. Other means for steering such car bodies or trucks have been by hand operated devices entailing the necessity of the use of additional help or making it necessary for the operator on the swing body or rotating bed during transportation to dismount therefrom at intervals to steer the machine.

My present invention contemplates the provision of suitable connections within reach of the operator on the operating platform upon the swing body or rotating bed, making it possible for him not only to control the power source, but also to operate the steering devices with the same facility that any other road vehicle may be operated by the driver.

Other objects of the invention will appear from the following description, which is directed to the preferred embodiment thereof as shown in connection with a track operated locomotive type of road crane, depicted in the drawings forming a part of the specification and the features of novelty are set forth in the appended claims.

In the said drawings

In the embodiment of the invention shown in Figs. 1 to 4 inclusive the swing body or rotating bed consisting of a suitable frame, as indicated by reference character 10, carries at one end the pivoted boom 11 and has also mounted thereon the power source, which may be in the form of a steam engine indicated generally by reference character 12, operated from boiler 13, or any other suitable source of power supply may be employed as a gas or gasoline engine. The swing body or rotating bed is pivotally mounted upon a suitable supporting track 14, the latter being peripherally toothed and adapted to be engaged by a spur gear 15 carried by the swing body or rotating bed 10. The supporting track 14 is fixed in relation to and carried by the frame 16 on the truck or car body and is in the form of a wheel or spider with a central hub portion 14ª, the latter being perforated and being adapted to receive suitable pivotal means for swivelly mounting the swing body or rotating bed on the car body or truck. Suitable anti-friction wheels 17 carry the swing body or rotating bed upon the upper track surface of the track member 14. The invention in Figs. 1 to 4 inclusive is shown applied to a road crane of the wheeled truck type provided with a live rear axle 18 suitably journalled in bearings on the car body or truck frame 16 and carrying at its extremities the supporting wheels 19 and 20 wheel 20 only being shown on the drawings so that rotation imparted to the live axle 18 will cause the traction wheels 19 and 20 to rotate and carry the machine over the ground according to the direction of rotation of said wheels. The crane of the type shown in Figs. 1 to 4 inclusive is so constructed and arranged that power from the crank shaft 21 of the engine will be transmitted through the gears 22 and 23 to the drum shaft 24 journalled in suitable supporting means carried by the rotating bed or swing body.

Figure 1:
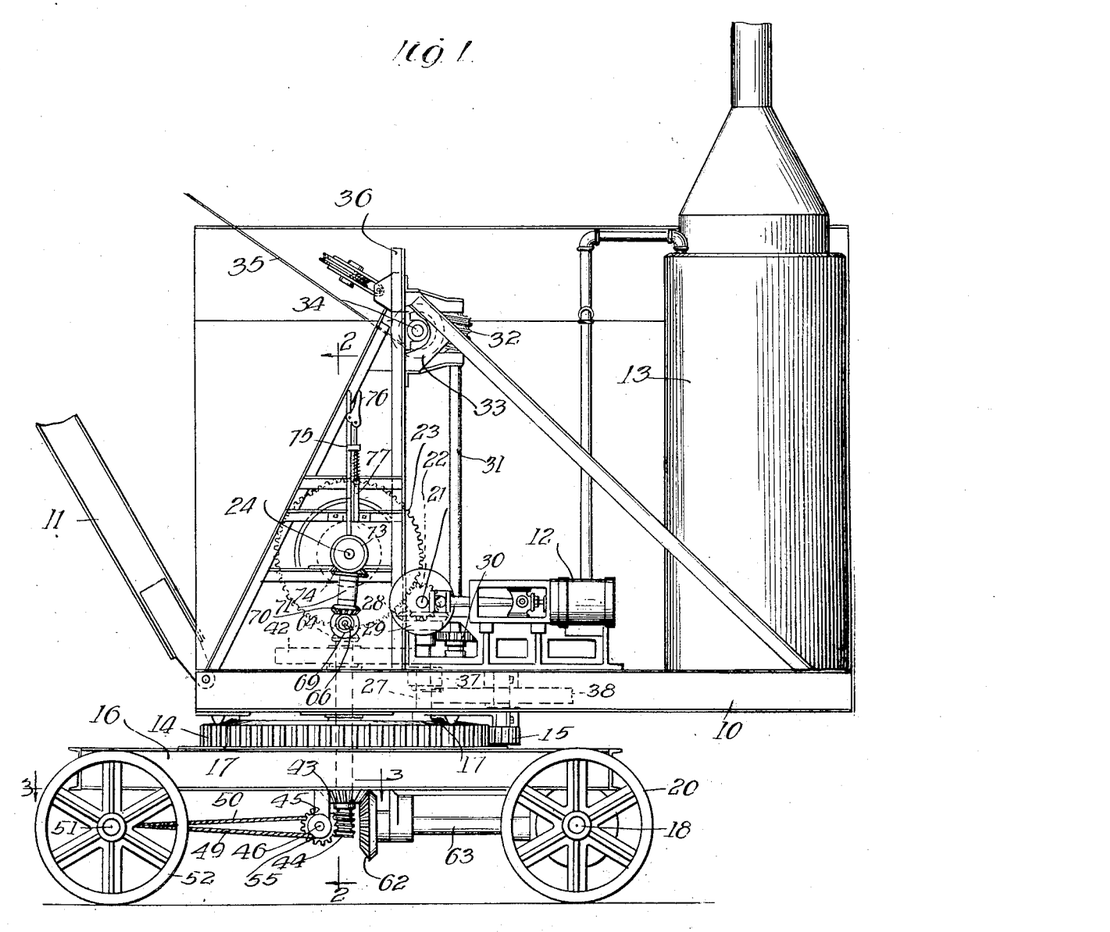
Fig. 1 is a side elevation of a road crane showing my invention applied thereto, the boom of the crane and the lines for operating the same being either removed or broken away.
Figure 2:
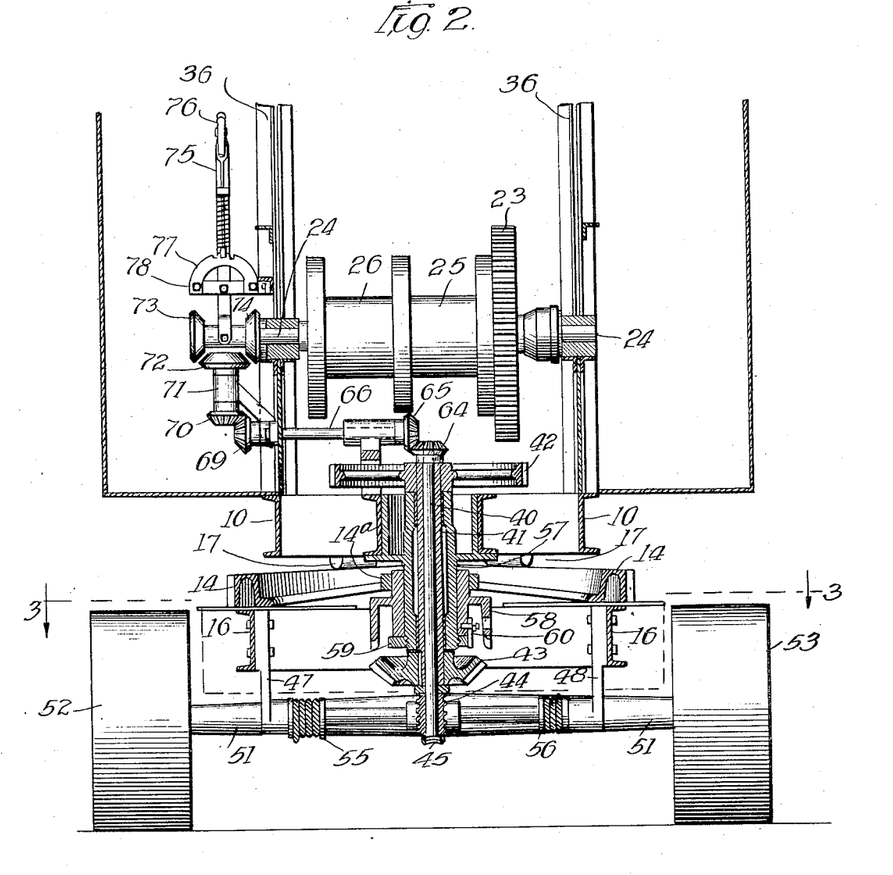
Fig. 2 is a section through the machine on line 2—2 of Fig. 1.
Figure 3:
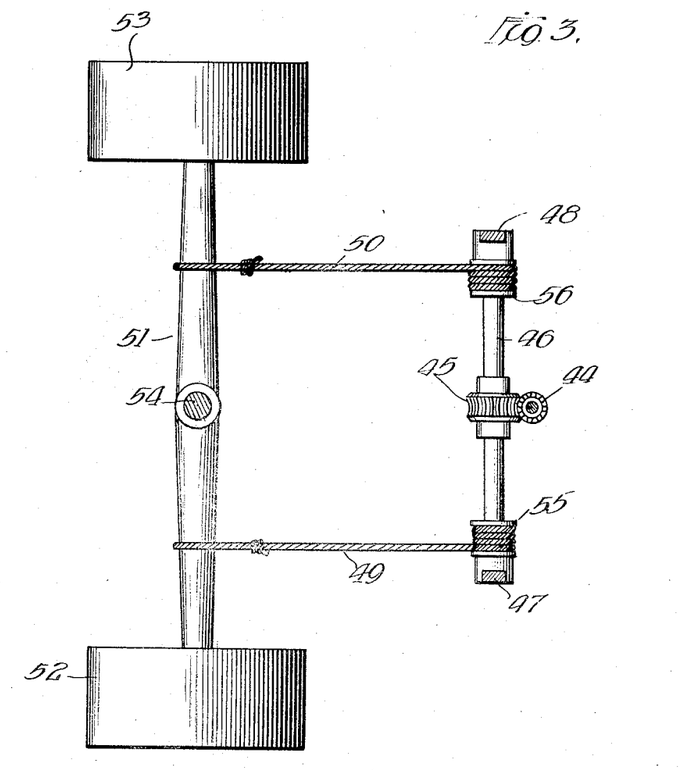
Fig. 3 is a plan view of the steering axle and associated parts, being a section taken on broken line 3—3 of Fig. 2.
Figure 4:
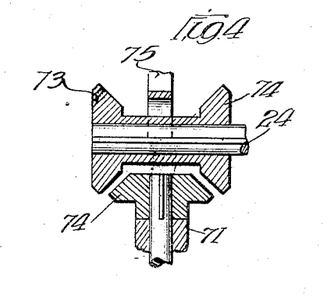
Fig. 4 is a detail of the friction drive mechanism for operating the steering mechanism.

The shaft 24 carries the holding drum 26 and the power drum 25. The power drum 25 is connected to shaft 24 by a suitable clutch mechanism not shown and the holding drum 26 will be arranged to be driven for the purpose of taking up slack in the holding cable by friction of this drum with some moving part on shaft 24. A vertical shaft 27 suitably journalled in the swing body frame 10 carries a bevel gear at its upper extremity meshing with a bevel gear on the engine shaft 21, not shown, but of approximately the same peripheral size as the gear 22, the bevel gear on shaft 27 being designated by reference character 28. By the aforesaid construction the bevel gear engaging the bevel gear 28 being under the control of suitable friction clutches, not shown, rotation may be imparted to the shaft 27 in either direction from the engine shaft 21 under the control of the operator. The shaft 27 carries adjacent the bevel gear 28 a spur gear 29, which is adapted to be engaged by the sliding gear 30 on vertical shaft 31, which carries worm 32 at its upper extremity for driving worm gear 33 on shaft 34, which carries a drum for operating the boom hoist cable 35, the latter described mechanism being all supported by suitable uprights carried by frame 10 and indicated by reference character 36 (Fig. 1.) The shaft 27 also carries a sliding gear 37 adapted to mesh with the large gear 38, which is keyed to a short shaft journalled in a part rigid with the swing body frame 10, said shaft carrying the aforesaid spur gear 15 at its lower extremity so that upon the rotation of the gear 15 by the source of power the swing body 10 will be pivotally rotated about the center line of its axial connection with the car body or truck.

The pivotal connection of the swing body or rotating bed and the mechanism carried thereby with the truck or car body is accomplished by the use of a connecting shaft with suitable sleeves acting as a pivotal connection between the swing body and truck as well as a means for conveying power from the swing body to the truck frame, for the purpose of operating and steering the carrying wheels or other supporting devices of the truck or car body.

A vertical shaft 40 passes from the frame 10 of the swing body or rotating bed down through the approximate center of the circular supporting member and track 14 serving as a king pin or shaft for centering the rotation of the swing body or rotating bed in relation to the car body or truck. The shaft 40 is journalled on the interior of a hollow cylindrical power shaft 41 which carries the gear 42 at its upper end and a bevel gear 43 at its lower extremity. The shaft 40 projects below the bevel gear 43 and has fixed thereto a worm 44 adapted to engage worm gear 45 of the shaft 46, which is journalled in suitable supports 47, 48 carried by the frame 16 of the truck or car body. The shaft 46 carries adjacent the brackets or supports 47, 48 suitable drums or spools on which are wound in reverse directions the cables 49, 50 of suitable flexible material such as wire rope, having connections at their extremities remote from the said drums or spools with the pivoted front axle 51 of the car body or truck, the latter being provided at its extremities with the usual carrying wheels 52, 53, and the pivotal connection with the car body or truck frame being indicated at 54. The said spools or drums of the shaft 46 are designated by reference characters 55 and 56 respectively, and the flexible cables 49 and 50 being wound thereon in reverse directions, it will be seen that as one of the cables is wound on one of the spools the other will be given off at the same rate of travel so that the axle 51 will be rotated on its pivotal connection 54 with the frame in either of two directions according to the direction of rotation imparted to the shaft 46. The steering shaft 40 and the main driving sleeve 41 surrounding the same are journalled and held in their normal vertical position by a suitable sleeve bearing member indicated by reference character 57, the latter being journalled in a supporting member or casting indicated by reference character 58, the latter serving to support the aforesaid shaft and sleeve in relation to the circular track member 14, which is, as before stated, secured rigidly to the frame of the car body or truck. The casting 58 and the sleeve 57 are prevented from separating by means of a threaded nut or plate 59, (see Fig. 2), the latter being held in position on said sleeve 57 by a locking device designated at 60.

By the aforesaid construction power supply applied to the gear 42 on the vertical sleeve 41 will be transmitted through the pivotal connection between the swing body or rotating bed and the car body through the bevel gear 43 to the co-operating bevel gear 62 on the drive shaft 63 which engages the live shaft 18 of the rear axle through suitable gears of any conventional type, not herein shown, so that whenever the gear 42 and the sleeve 41 are operated the corresponding movement will be imparted to the rear drive wheels of the car body or truck in the direction desired by the operator and determined by the operation of the gears on the drive shaft as described. The main drive sleeve 41 extending into the car body or truck being of cylindrical form permits the introduction of power from the power source into the truck frame for the purpose of operating the steering mechanism and this is accomplished by the provision of a bevel gear 64 which is fixed to the upper extremity of shaft 40 in mesh with bevel gear 65 on horizontal shaft 66 carrying bevel gear 69 at its outer extremity on the side of the swing body frame meshing with bevel gear 70 on a short shaft journalled in a bearing 71 on the side of the swing body frame and carrying on the upper extremity of the shaft and upper side of the bearing 71 a bevel friction gear 72 adapted to be engaged by either of the two sliding friction gears 73, 74, the latter being rotatably connected with drum shaft 24 but slidable thereon under the control of a suitable lever 75 having a latch 76 thereon, spring controlled, and a detent connected with said latch for engaging any one of a number of notches provided on a segment 77 connected by a suitable bracket 78 to the vertical frame member 36 of the swing body. By this construction the operator may upon manipulating the lever 75 cause either of the friction gears 73, 74 to engage the friction gear 72 and the direction of rotation of the gear 72 and the vertical steering shaft 40 will be determined thereby as well as the direction of rotation of the worm 44 and the worm gear on the shaft 46 in engagement therewith. By this construction the operator may when the power shaft is rotating cause the front pivoted axle carrying the steering wheels 52, 53 to be rotated from side to side and thus steer the machine either to the right or the left of the direct center line as the machine is moving under its own power in either direction. It will be obvious that the machine may be driven by the described mechanism in either the forward or reverse direction and that the operator may operate the steering wheels to cause the machine to turn either toward the right or the left at will and that the swinging movement of the swing body or rotating bed will be determined by the operator according to the manner in which the clutches on the power shaft are operated.

It will also be seen that the driving mechanism for giving traction to the rear driving wheels of the machine can only be operated when the mechanism for operating the swing body or rotating bed is disconnected, since the large gear 38 which operates the swing body will have power transmitted to it through the spur gear 37, which latter is the means for transmitting power from the vertical shaft 27 to the gear 42 in the driving power transmission mechanism.

In the modifications of the invention shown in Figs. 5 to 12 inclusive the invention is applied to a road crane in which the swing body or rotating bed 10 and the essential parts of the mechanism carried thereby are identical with the disclosure shown in Figs. 1 to 4 inclusive. The car body or truck however, which carries the track gear 14 is modified, the frame thereof being arranged thereon to accommodate the use of endless belt traction devices instead of the supporting wheels for traction and steering, as illustrated in Figs. 1 to 4 inclusive. It is the purpose of that part of the invention embodied in the modified forms shown in Figs. 5 to 12 inclusive to indicate how the invention may be adapted to the steering of a truck or car body for supporting the operative parts of the crane carried upon endless belt traction devices. The truck or car body will be provided with the usual rectangular frame 80 and power will be transmitted to the bevel gear 43 by the identical mechanism shown in Figs. 1 to 3 inclusive. Meshing with bevel gear 43 is a bevel gear 82 on a power shaft 99 which is rotatably journalled in suitable brackets 100, 101 carried by the frame 80. It is well known that in the steering of endless belt types of traction devices the course of the machine may be varied by moving the belt on one side of the machine, while allowing the one on the reverse side to remain idle or moving the latter in the reverse direction. To accomplish this result in steering as well as to cause the driving mechanism to impart movement in either the forward or reverse direction to the driving belt on each side of the machine synchronously is the purpose of the driving and clutch mechanism, which will now be described.

Figure 5:
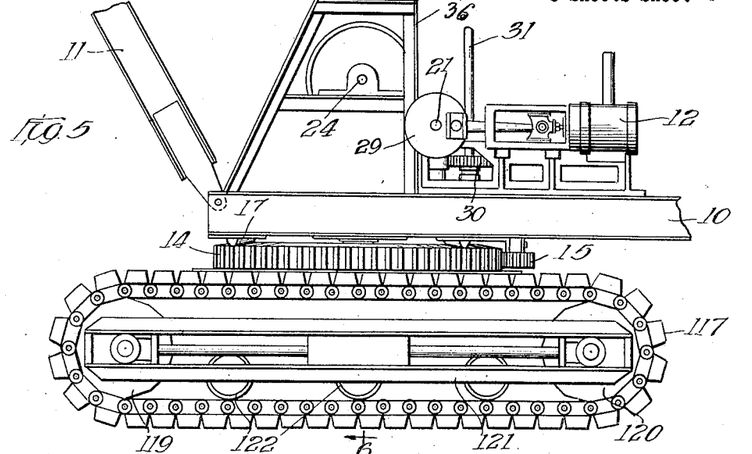
Fig. 5 is a view similar to Fig. 1 with parts of the swing body or rotating bed broken away and showing the truck or car body supported and operated by endless belt traction devices driven from the power source on the swing body or rotating bed.

The shaft 40 of the form of the invention shown in Figs. 1 to 4 inclusive will be provided at its upper extremity instead of with the bevel gear 64 with a suitable hand lever, the hub of which is designated by reference character 85 and the handle of the same by reference character 86. In this construction the steering is accomplished by hand manipulation and as the operator moves the lever 86 from side to side and pivotally around the shaft 40 he will cause the shaft 40 to rotate and impart a swinging movement to the arm 87 secured to the lower extremities of the shaft, the latter being in turn pivotally connected at 88 with a link 89 having pivotal connection at its extremities at 90 and 91 with two forked arms 92, 93 respectively, both being pivotally connected as at 94, 95 to a cross member or brace 96 secured to the frame of the car body or truck. The free extremities of the lever arms 92, 93 are forked to encircle a groove in collars 97, 98, which are slidably mounted on a cylindrical part of sleeves which carry suitably enlarged jaw clutches indicated at 105, 106. The sleeves on the clutches 105, 106 carry at their inner extremities fixed collars 107, 108 and interposed between the fixed groove collars 107, 108 and the clutch members 105, 106 are suitable coiled springs 109, 110. Journalled around the shaft 99 and within the bearings 100, 101 are suitable sleeves carrying clutch members 111, 112, the same being provided with indentations and projections adapted to engage with corresponding indentations and projections on the clutch members 105, 106, and the said sleeves extending outwardly and into engagement with gears journalled to the supporting shaft 99 and being toothed and adapted to take flexible members as the chains 115, 116, which latter engage suitable sprocket gears, not shown, for the purpose of driving the endless belt traction devices at the sides of the frame, indicated by reference characters 117, 118. The endless belt traction devices 117, 118 may be of any desired construction consisting ordinarily of blocks hinged together and provided with suitable means for engaging and supporting driving wheels which may be of the type designated by reference characters 119, 120 (Fig. 5). When the car body or truck is designed to accommodate the endless belt traction devices there will be suitable connections between the end bearings supporting the wheels 119, 120 as indicated by the frame 121, Fig. 5, which may also support suitable rollers or idlers as designated by reference character 122.

Figure 6:
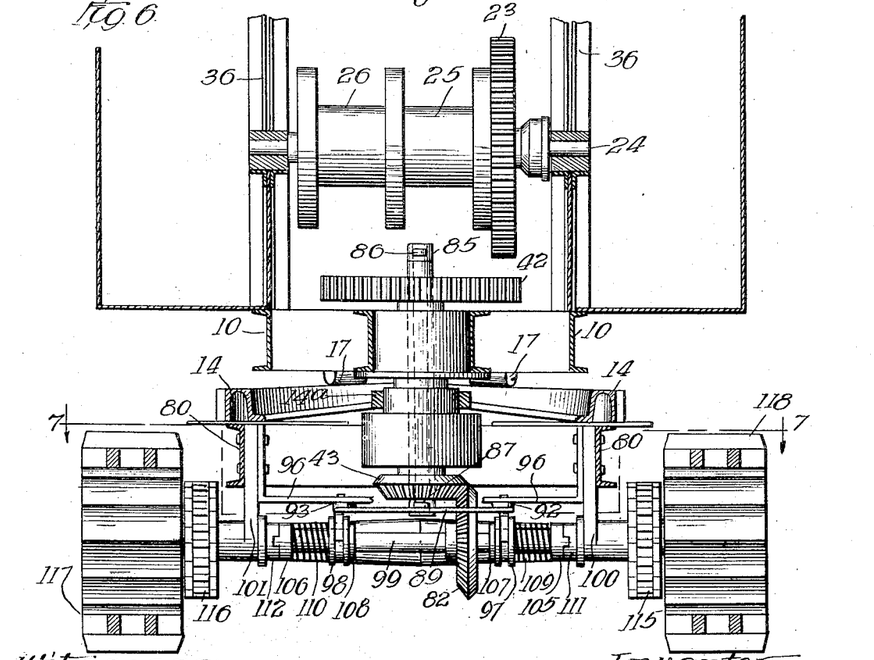
Fig. 6 is a vertical sectional view on line 6—6 of Fig. 5.
Figure 7:
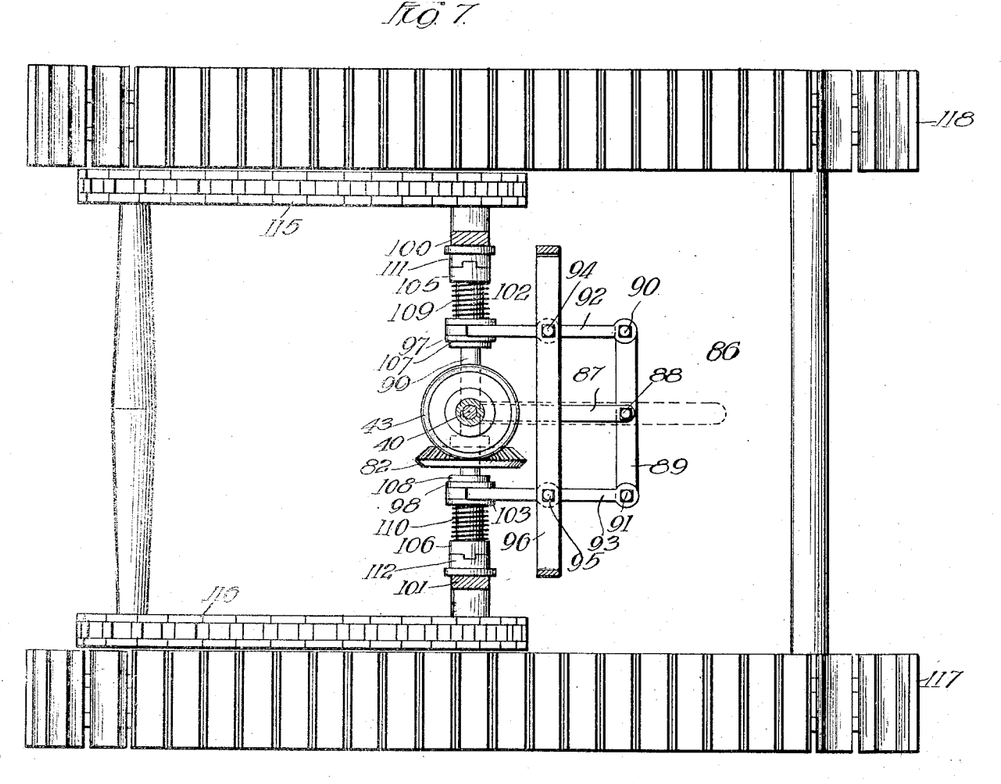
Fig. 7 is a sectional view through the steering mechanism being taken on broken line 7—7 of Fig. 6.
Figures 8, 9, 10, 11, 12:
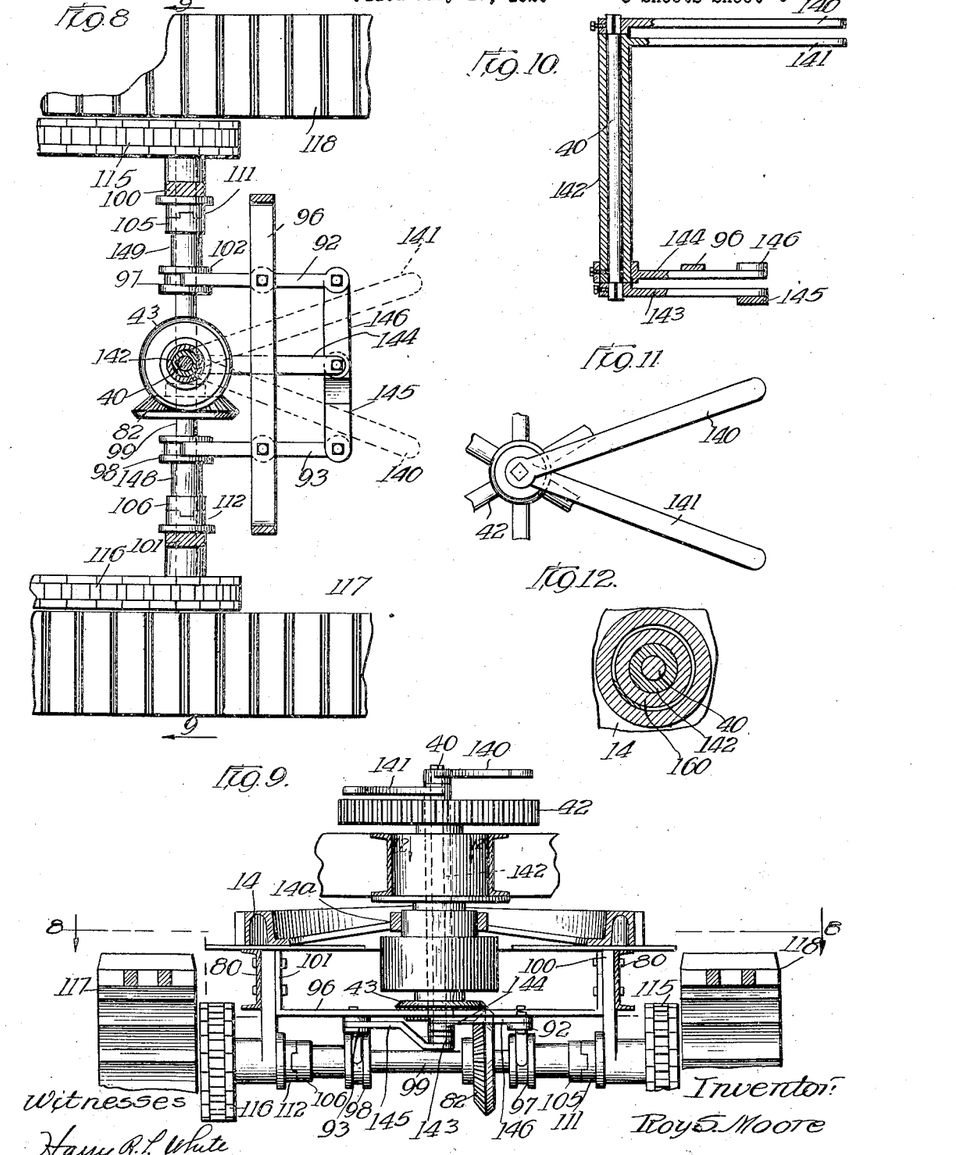
Figs. 8 to 12 inclusive illustrate a modification of the steering device for the endless belt traction device shown in Figs. 5 to 7 inclusive, the steering mechanism being operated in the machine shown in the last said views by a single lever and in the form of the invention shown in Figs. 8 to 12 inclusive the operating clutches and steering mechanism are operated by dual levers, one lever for the clutch associated with each of the endless belt devices.

The manner of steering the machine when equipped with the endless belt traction devices as illustrated in Figs. 5 to 7 inclusive will be apparent in view of the foregoing description and from which it will be seen that when the source of power is operated with the operator in a convenient position to grasp the steering lever 86 he may if desired permit the lever to remain in the position shown for example in Fig. 7 allowing both clutch devices to remain in engagement so that the machine may be moved in either the forward or reverse direction with both of the endless belt traction devices operating uniformly in the same direction and at approximately the same rate of speed. If it is desired to move one of the belts or traction devices and allow the other to remain inoperative so as to get a swing movement on the stationary belt the operator may by swinging the hand lever to one side disengage the clutch on the side to which the lever is swung, while the same movement will simply compress the spring upon the movable jaw of the other clutch. Obviously, the movement of the hand lever 86 in the reverse direction will throw out the clutch on the other side and this will result in a swinging movement when the belt on that side is thus operated either in the forward or reverse direction with the belt or traction device on the other side of the machine stationary.

From the foregoing it will be seen that the vertical shaft 40 with its connections passing down through the pivotal center between the swing body and the car body furnishes a convenient means for the use of the operator in steering the machine by acting upon the clutches which control the driving mechanism to the endless belt traction devices at each side of the truck or car body frame.

In Figs. 8 to 12 inclusive I show a slight modifications of the endless belt driven truck and steering mechanism of Figs. 5 to 7 inclusive, which consists in the use of two hand levers instead of the single control lever 86. In this modification of the invention the endless belts 117, 118 are employed, the only difference being that the shaft 40 has a lever 140 connected therewith and there is a second hand lever 141, the hub of which encircles the shaft 40 and is elongated in the form of a sleeve, as indicated at 142 and extends down to approximately the lower extremity of the shaft 40 and has rigidly connected therewith an arm 144 while an arm 143 is connected to the lower end of shaft 40. With this form of control using the tool levers 140, 141 the arms 143, 144 will have separate link connections as indicated at 145, 146 leading to the shifter forks 92, 93. The clutch mechanism on shaft 99 will be slightly modified as illustrated so that the forked ends of the levers 92, 93 will engage enlarged grooved portions of sleeves 148, 149 each of which carries one part of a jaw clutch adapted to engage the clutch jaws 111, 112 on the driving gears. This construction permits of the elimination of all springs and puts the control of each of the clutches under the action of independent levers. In the form of the invention of Figs. 8 to 12 inclusive it will be seen by reference to the drawings that the steering shaft 40 will be surrounded by supplemental steering shaft 142 and that the driving power to gears 43 and 82 will be transmitted through the concentric sleeve which is designated by reference character 160, Fig. 12. all of these sleeves and shafts being journalled in a suitable bearing in the track plate 14.

I have illustrated and described the preferred forms of the invention bearing in mind that persons skilled in the art may resort to various modifications of the same without departing from the purpose and spirit of my invention.

I claim:

1. An automotive truck, having a swing body supported on the truck by a hollow driving shaft about which the body is adapted to swing, a rotatable drum mounted on the swing body, a clutch adapted to rotate with the drum, and a rotatable power shaft extending downwardly through the driving shaft and operably related at its lower extremity to steering wheels carried by the truck and operably related at its upper end to the clutch.

2. An automotive truck, wheels carried by an axle pivotally related to the truck, a swing body mounted on the truck by a hollow pivotal member, a rotatable drum carried by the swing body, a shiftable clutch related to and adapted to rotate with the drum, means for shifting the clutch, a rotatable power shaft extending from within the swing body downwardly through the hollow pivotal member, a gear carried by the lower extremity of the power shaft and adapted to transmit power to a shaft for rotating propelling wheels carried by the truck, a rotatable shaft extending from within the swing body downwardly through the power shaft, a worm gear carried by the lower extremity of the last named shaft and adapted to mesh with a worm wheel for rotating drums carried by the frame of the truck, and cables operably related to said drums and said pivotal axle, said last named shaft being operably related to said shiftable clutch at its upper end.

3. A locomotive truck having a swing body supported on the truck by a hollow driving shaft about which the body is adapted to swing, a rotatable drum mounted on the swing body, a clutch adapted to rotate with the drum, and a rotatable power shaft extending downwardly through the driving shaft and operably related at its lower extremity to steering wheels carried by the truck and operably related at its upper end to the clutch.

4. An automotive truck, wheels carried by an axle pivotally related to the truck, a swing body mounted on the truck, a rotatable drum carried by the swing body, a shiftable clutch related to and adapted to rotate with the drum, means for shifting the clutch, a hollow driving shaft extending downwardly from within the swing body for transmitting power to the propelling wheels, a second driving shaft extending downwardly from within the swing body and through the first named shaft, a gear carried by the lower extremity of the last named shaft and adapted to mesh with a worm wheel for rotating drums carried by the frame of the truck, and cables operably related to said drums and said pivotal axis, the last named shaft being operably related to said shiftable clutch at its upper end.

5. The combination with an automotive truck of wheels carried by an axle pivotally related to the truck, a swing body mounted on the truck, a hoisting drum mounted on the swing body, a boom mounted on the swing body, the drum being adapted to actuate the boom by means of a cable wound thereabout, a shiftable clutch related to and adapted to rotate with the drum, means for shifting the clutch, a rotatable power shaft extending from within the swing body downwardly for transmitting power to propelling wheels carried by the rear axle of the truck, a second power shaft extending downwardly from within the swing body and through the first named power shaft, a worm carried by the lower extremity of the last named shaft and adapted to mesh with a worm wheel for rotating drums carried by the frame of the truck, and cables operably related to said drums and said pivotal axle, the said last named shaft being operably related to the clutch.

6. An automotive truck, having a swing body mounted on said truck, a boom carried by said swing body, a drum shaft mounted on said swing body, a rotatable drum mounted on said shaft, a gear secured to said shaft, an engine mounted on said swing body, a crank shaft for said engine, a pinion carried by said crank shaft and meshing with the gear on said drum shaft, a traction transmitting shaft operatively connected with said engine and extending through the pivot of said swing body for transmitting power to the traction wheels, and a power driven steering shaft extending through said traction transmitting shaft and operatively connected at its upper end with said drum shaft and at its lower end with the steering wheels of the truck for controlling the steering of the truck.

7. An automotive truck, having a swing body mounted on said truck, a boom carried by said swing body, a drum shaft mounted on said swing body, a rotatable drum mounted on said shaft, a gear secured to said shaft, an engine mounted on said swing body, a crank shaft for said engine, a pinion carried by said crank shaft and meshing with the gear on said drum shaft, a traction transmitting shaft operatively connected with said engine and extending through the pivot of said swing body for transmitting power to the traction wheels, a power driven steering shaft extending through said traction transmitting shaft and operatively connected at its upper end with said drum shaft and at its lower end with the steering wheels of the truck for controlling the steering of the truck, and reversible clutch controlling mechanism mounted on said drum shaft for operatively controlling said steering wheels.

It testimony whereof I have signed my name to this specification, on this 12th day of July A. D. 1920.

ROY S. MOORE.